United States Patent
Li et al.

(10) Patent No.: US 9,730,050 B2
(45) Date of Patent: Aug. 8, 2017

(54) ENODEB REFERENCE SIGNAL REDUCTION

(71) Applicant: Intel IP Corporation, Santa Clara, CA (US)

(72) Inventors: Qinghua Li, San Ramon, CA (US); Hooman Shirani-Mehr, Portland, OR (US); Yuan Zhu, Beijing (CN); Xiaogang Chen, Beijing (CN); Feng Xue, Redwood City, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/766,952

(22) PCT Filed: Dec. 16, 2013

(86) PCT No.: PCT/US2013/075463
§ 371 (c)(1),
(2) Date: Aug. 10, 2015

(87) PCT Pub. No.: WO2014/158255
PCT Pub. Date: Oct. 2, 2014

(65) Prior Publication Data
US 2016/0020843 A1 Jan. 21, 2016

Related U.S. Application Data (60) Provisional application No. 61/806,821, filed on Mar. 29, 2013.

(51) Int. Cl.
*H04B 7/04* (2017.01)
*H04B 7/06* (2006.01)
(Continued)

(52) U.S. Cl.
CPC ............ *H04W 8/082* (2013.01); *H04B 1/56* (2013.01); *H04B 7/0417* (2013.01);
(Continued)

(58) Field of Classification Search
CPC .. H04B 7/0408; H04B 7/0413; H04B 7/0417; H04B 7/0452; H04B 7/0456;
(Continued)

(56) References Cited

U.S. PATENT DOCUMENTS 7,426,198 B2 * 9/2008 Mondal ................ H04B 7/0617
370/286
7,809,074 B2 * 10/2010 Kotecha ............... H04B 7/0413
375/259

(Continued)

FOREIGN PATENT DOCUMENTS

WO 2010/071492 A1 6/2010

OTHER PUBLICATIONS

International Search Report and Written Opinion mailed Mar. 19, 2014 for International Application No. PCT/US2013/0754463, 13 pages.

(Continued)

*Primary Examiner* — Betsy Deppe
(74) *Attorney, Agent, or Firm* — Schwabe, Williamson & Wyatt, P.C.

(57) ABSTRACT

In embodiments, apparatuses, methods, and storage media may be described for reducing the overhead associated with the transmission of channel training signals from an eNodeB (eNB) of a wireless network. Specifically, the eNB may receive feedback from a user equipment (UE) regarding the received signal energy of a first and second beamformed signal produced with a first and second beamforming vector, respectively. The eNB may identify, based on the feedback of the received signal energy, a signal subspace and a null subspace. The eNB may then transmit a channel training signal to the signal subspace.

20 Claims, 4 Drawing Sheets

(51) Int. Cl.
| | |
|---|---|
| H04W 8/08 | (2009.01) |
| H04L 5/00 | (2006.01) |
| H04B 1/56 | (2006.01) |
| H04W 48/16 | (2009.01) |
| H04W 36/30 | (2009.01) |
| H04W 24/00 | (2009.01) |
| H04W 36/26 | (2009.01) |
| H04W 48/18 | (2009.01) |
| H04B 7/0417 | (2017.01) |
| H04W 36/00 | (2009.01) |
| H04W 36/22 | (2009.01) |
| H04L 1/18 | (2006.01) |
| H04W 24/02 | (2009.01) |
| H04W 72/04 | (2009.01) |
| H04W 72/08 | (2009.01) |
| H04W 28/20 | (2009.01) |
| H04L 29/06 | (2006.01) |
| H04M 1/725 | (2006.01) |
| H04W 4/02 | (2009.01) |
| H04W 8/02 | (2009.01) |
| H04W 8/06 | (2009.01) |
| H04W 28/02 | (2009.01) |
| H04W 76/02 | (2009.01) |
| H04W 48/06 | (2009.01) |
| H04L 25/03 | (2006.01) |
| H04N 21/24 | (2011.01) |
| H04N 21/845 | (2011.01) |
| H04N 21/8543 | (2011.01) |
| H04B 7/0452 | (2017.01) |
| H04B 7/08 | (2006.01) |
| H04L 25/02 | (2006.01) |
| H04W 36/08 | (2009.01) |
| H04W 48/12 | (2009.01) |
| H04W 88/08 | (2009.01) |
| H04W 84/04 | (2009.01) |
| H04W 88/10 | (2009.01) |
| H04W 84/12 | (2009.01) |
| H04W 88/02 | (2009.01) |
| H04W 28/08 | (2009.01) |

(52) U.S. Cl.
CPC ............ *H04B 7/0452* (2013.01); *H04B 7/063* (2013.01); *H04B 7/0619* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 25/0206* (2013.01); *H04L 25/03305* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72572* (2013.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/0226* (2013.01); *H04W 28/0289* (2013.01); *H04W 28/20* (2013.01); *H04W 36/0005* (2013.01); *H04W 36/0011* (2013.01); *H04W 36/0022* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 72/0446* (2013.01); *H04W 72/082* (2013.01); *H04W 76/025* (2013.01); *H04L 5/0007* (2013.01); *H04L 2025/03426* (2013.01); *H04W 28/085* (2013.01); *H04W 36/08* (2013.01); *H04W 48/12* (2013.01); *H04W 72/046* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(58) Field of Classification Search
CPC .. H04B 7/0617; H04B 7/0619; H04B 7/0621; H04B 7/0623; H04B 7/063; H04B 7/0632; H04B 7/0695; H04B 7/088; H04W 72/046; H04W 72/08; H04W 72/085; H04W 4/021; H04W 8/082; H04W 8/02; H04W 8/06; H04W 24/00; H04W 24/02; H04W 28/0226; H04W 28/0289; H04W 28/20; H04W 36/0005; H04W 36/0011; H04W 36/0022; H04W 36/22; H04W 36/26; H04W 36/30; H04L 5/0048; H04L 5/0051; H04L 5/0057; H04L 5/0085
USPC ........................ 375/267, 299; 455/101, 562.1
See application file for complete search history.

(56) References Cited

U.S. PATENT DOCUMENTS

| | | |
|---|---|---|
| 9,572,197 B1* | 2/2017 | Wurtenberger ....... H04W 88/08 |
| 2006/0094373 A1 | 5/2006 | Hottinen |
| 2009/0067375 A1 | 3/2009 | Wong et al. |
| 2009/0252250 A1 | 10/2009 | Heath, Jr. et al. |
| 2009/0322613 A1* | 12/2009 | Bala ..................... H04B 7/022 342/373 |
| 2010/0075705 A1 | 3/2010 | van Rensburg et al. |
| 2011/0205963 A1 | 8/2011 | Tang et al. |
| 2013/0059619 A1 | 3/2013 | Kim et al. |

OTHER PUBLICATIONS

Extended European Search Report issued Nov. 28, 2016 from European Patent Application No. 13880250.9, 13 pages.

* cited by examiner

ENODEB REFERENCE SIGNAL REDUCTION

CROSS REFERENCE TO RELATED APPLICATIONS

The present application is a national phase entry under 35 U.S.C. §371 of International Application No. PCT/US2013/075463, filed Dec. 16, 2013, entitled "ENODEB REFERENCE SIGNAL REDUCTION", which claims priority to U.S. provisional application No. 61/806,821, filed Mar. 29, 2013, entitled "ADVANCED WIRELESS COMMUNICATION SYSTEMS AND TECHNIQUES" PCT/US2013/075463 designated, among the various States, the United States of America. The Specifications of the PCT/US2013/075463 Application and U.S. provisional application No. 61/806,821 are hereby fully incorporated by reference.

FIELD

Embodiments of the present invention relate generally to the technical field of channel training signals in wireless systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Full dimension multiple-input-multiple-output (FD-MIMO) is a study item for the upcoming Release 12 of the third generation partnership project (3GPP) long term evolution (LTE) specifications. In FD-MIMO systems, the eNodeB (eNB) may have 16 or more different antenna elements that are configured for beamforming on one or more antenna ports to user equipment (UEs). Ideally, the throughput of the eNB in FD-MIMO systems may be expected to significantly increase with a large number of antenna elements.

However, in frequency division duplex (FDD) mode, beamforming may require channel training signals. Specifically, channel training signals may be reference signals that are sent by the eNB to each UE. The UE(s) may then respond with channel feedback based on the received channel training signals. This feedback may be used to identify the resources used to beamform one or more additional signals to the UE. Currently, the overhead associated with transmitting the channel training signals may increase linearly with the number of antenna elements. For large antenna arrays having, for example, 30 antenna elements, the overhead associated with transmitting the channel training signals may become prohibitive because the throughput gains realized through use of FD-MIMO may be offset by the overhead incurred through transmission of the channel training signals.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods, and storage media are described herein for reducing the overhead associated with the transmission of channel training signals such as the channel state information reference signal (CSI-RS). As described above, the number of antenna ports of an eNB may linearly increase with an increase in the number of antenna elements used by the eNB. This increase in antenna ports may increase transmissions of channel training signals, which in turn may increase resource overhead of the eNB.

The channel training signals may be shared between the antenna ports in order to reduce the resource overhead of the eNB. However, time sharing of the channel training signals may introduce latency or delay to transmissions of the eNB. As noted above, the channel training signals may be transmitted from the eNB, and the UE may feed back information related to the channel training signals, and more specifically the radio resources used to transmit the channel training signals. Based on the fed back information, the eNB may identify radio resources that should be used for further communication with the UE.

However, the latency introduced by time sharing of the channel training signals may be detrimental because the latency may be such that the radio resources in the cell may have changed significantly between the transmission of the channel training signal and the identification of the channel resources to use to transmit further signals using the feedback based on the transmission of the channel training signal. In other words, the fed back information from a UE receiving the channel training signals may not necessarily correspond to the radio resources of the cell at the time of transmission of the additional signal(s) from the eNB. This change may be due to interference caused by multiple UEs, the UE moving, or other reasons. Therefore, time sharing of the channel training signals may reduce overall performance of the cell.

By contrast, the present disclosure may relate to selectively transmitting one or more channel training signals to particular signal subspaces. Specifically, the channel training signals may be beamformed to those signal subspaces. Typically, beamforming may include multiplying a signal by an antenna-specific or antenna-port specific weighting vector, which may be referred to as a beamforming vector. The beamforming vector may affect the phase of the signal, the amplitude of the signal, or some other characteristic of the signal. The weighted signal produced by this weighting may be referred to as a beamformed signal. By multiplying one or more antenna transmissions by the weighting vector, the beamformed signal may only be transmitted to a specific signal subspace.

Specifically, a signal subspace may be a vector space defined by a subset of the possible beamforming vectors. In other words, transmissions of the signal to the signal subspace may include weighting the signal by one or more beamforming vectors of the possible beamforming vectors to produce a beamformed signal, and transmitting the beamformed signal from the eNB. The signal subspace may be identified by identifying the beamforming vectors with which the UEs receive the signal with a relatively high signal energy. Specifically, as noted above, the eNB may initially transmit one or more training signals to one or more UEs, and receive feedback information from the UEs regarding the received signal. For example, the feedback may include information regarding strength or magnitude of the received signal energy, or the phase of the received signal. Based on that fedback information, the eNB may be able to identify the beamforming vectors that produce a relatively high amount of signal energy at the UEs. The identified beamforming vectors that produce a relatively high amount of signal energy at the UEs may then be used to identify the signal subspace on which the channel training signals should be transmitted. The eNB may then transmit the channel training signals to that signal subspace using the identified beamforming vectors.

The null subspace may then be identified as the remainder of the beamforming vectors that are not used for the beamforming signal transmission to the signal subspace. In some embodiments an additional channel training signal may be beamformed to only a portion of the null subspace, as explained in greater detail below. In embodiments, the number of beamforming vectors used to generate a beamformed signal for the signal subspace may be significantly less than the number of beamforming vectors in the null subspace. Therefore, the transmission overhead of the eNB may be significantly reduced. For example, the dimension of the null space may be several times that of the signal subspace that is useful for data communications. Therefore, skipping the channel training in the entire null space may reduce the training overhead by multiple times. For example, simulations indicate that by not transmitting the channel training signal to the entire null subspace, the resource overhead of the cell may be reduced by up to 50% while the throughput of an FD-MIMO eNB with 16 antenna elements may only be reduced by 5%. The overhead reduction may be expected to increase significantly for eNBs with antenna arrays of 64 or 128 antenna elements. For example, an eNB with 128 antenna elements transmitting data to 10 UEs may need up to 128 antenna ports in legacy systems, while only needing up to 10 antennas ports (one antenna port per UE) in wireless cells of the present disclosure.

In some embodiments, and as described in further detail below, one or both of the signal and/or null subspaces may vary over time due to mobile channel variation. Because the eNB may identify or update the signal subspace and null subspace according to the feedback indications of training signals that were beamformed by the previous beamforming vectors, the currently updated signal subspace and null subspaces may not be exactly the same as the previous signal and null subspaces where the previous beamforming vectors are located. Therefore, in some embodiments, the newly identified subspace may not fully include the previous beamforming vector. However, since the channel variation may be relatively slow in many embodiments such that the subspaces are substantially correlated in time, i.e. very alike, the previous and the current signal and null subspace may be substantially the same.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
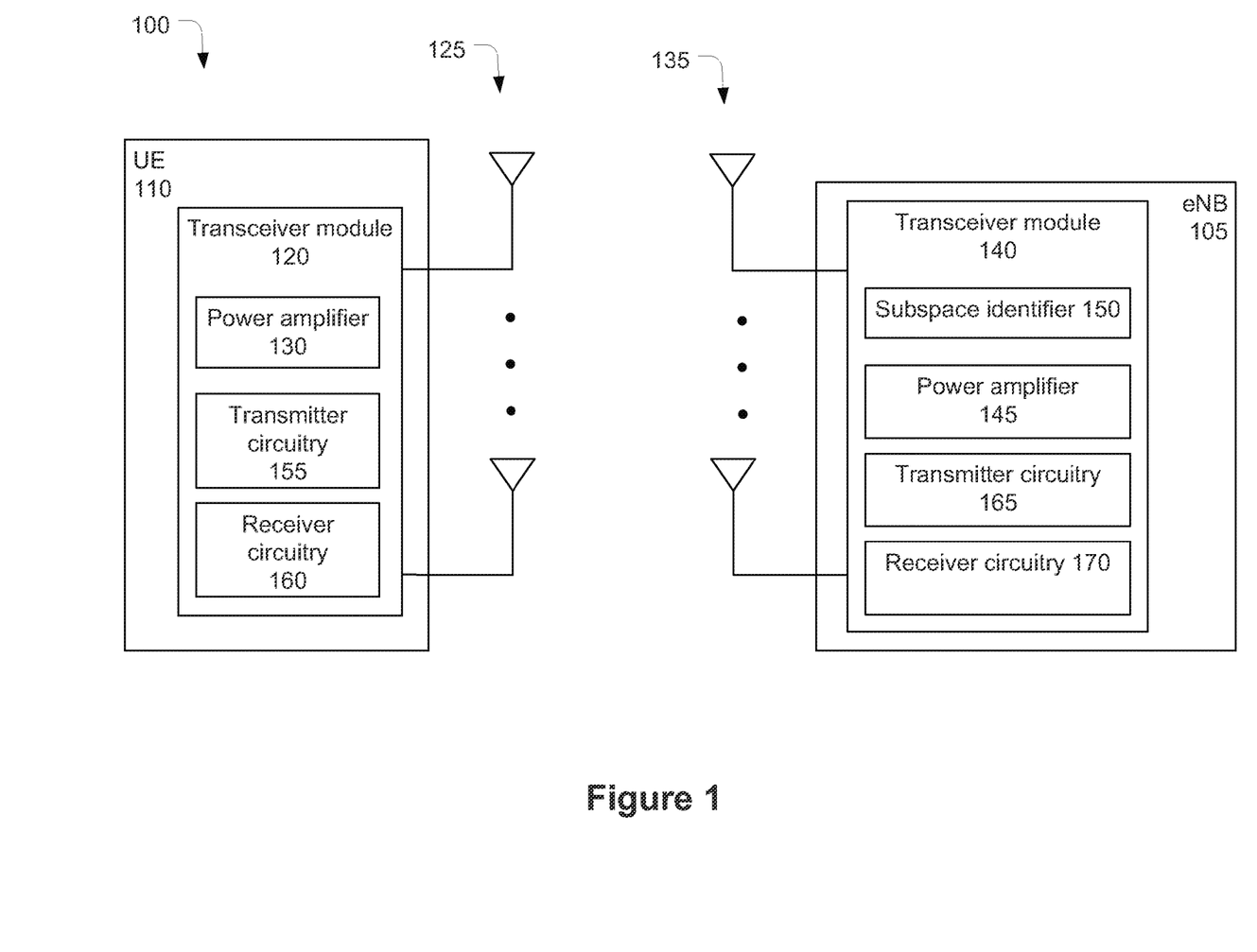
FIG. 1 schematically illustrates a high-level example of a network system comprising a UE and an eNB, in accordance with various embodiments.

FIG. 1 schematically illustrates a wireless communication network 100 in accordance with various embodiments. The wireless communication network 100 (hereinafter "network 100") may be an access network of a 3GPP LTE network such as evolved universal terrestrial radio access network (E-UTRAN). The network 100 may include an eNodeB (eNB, also referred to as an evolved NodeB) 105, configured to wirelessly communicate with a UE 110.

As shown in FIG. 1, the UE 110 may include a transceiver module 120. The transceiver module 120 may be coupled with one or more of a plurality of antenna elements 125 of the UE 110 for communicating wirelessly with other components of the network 100, e.g., eNB 105 or another UE. The antenna elements 125 may be powered by a power amplifier 130 which may be a component of the transceiver module 120, as shown in FIG. 1, or may be a separate component of the UE 110. In one embodiment, the power amplifier 130 provides the power for all transmissions on the antenna elements 125. In other embodiments, there may be multiple power amplifiers on the UE 110. The use of multiple antenna elements 125 may allow for the UE 110 to use transmit diversity techniques such as spatial orthogonal resource transmit diversity (SORTD), MIMO, or FD-MIMO. In certain embodiments the transceiver module 120 may contain both transmitter circuitry 155 and receiver circuitry 160. Specifically, the transmitter circuitry 155 may be configured to transmit a signal from the UE 110, for example using antenna elements 125. Similarly, the receiver circuitry 160 may be configured to receive a signal at the UE 110. Although FIG. 1 depicts the transceiver module 120 including both the transmitter circuitry 155 and the receiver circuitry 160, in other embodiments, the transceiver module 120 may be replaced by transmitter circuitry and receiver circuitry which are separate from one another (not shown).

In other embodiments, the transceiver module 120 may be coupled with processor circuitry configured to alter, process, or transform signals or data received from, or sent to, the transceiver module 120 (not shown).

Similarly to the UE 110, the eNB 105 may include a transceiver module 140. The transceiver module 140 may be further coupled with one or more of a plurality of antenna elements 135 of the eNB 105 for communicating wirelessly with other components of the network 100, e.g., UE 110. The antenna elements 135 may be powered by a power amplifier 145 which may be a component of the transceiver module 140, as shown in FIG. 1, or may be a separate component of the eNB 105. In one embodiment, the power amplifier 145 provides the power for all transmissions on the antenna elements 135. In other embodiments, there may be multiple power amplifiers on the eNB 105. The use of multiple antenna elements 135 may allow for the eNB 105 to use transmit diversity techniques such as SORTD, MIMO, or FD-MIMO. In certain embodiments the transceiver module 140 may contain both transmitter circuitry 165 and receiver circuitry 170 which may be similar to the transmitter circuitry 155 and receiver circuitry 160 described above. In other embodiments, the transceiver module 140 may be replaced by transmitter circuitry and receiver circuitry which are separate from one another (not shown). In other embodiments, the transceiver module 140 may be coupled with processor circuitry configured to alter, process, or transform signals or data received from, or sent to, the transceiver module 120 (not shown).

As noted above, an eNB such as eNB 105 may have a plurality of antenna ports, and each antenna port may correspond to one or more of the antenna elements 135. In embodiments the transceiver module 140 may additionally include, or otherwise be coupled with, a subspace identifier 150. As will be explained in additional detail below, the subspace identifier 150 may be configured to identify signal subspaces and/or null subspace(s) in the cell.

In embodiments, an antenna port may be perceived by a UE 110 over the air interface between the UE 110 and the eNB 105. In embodiments, one antenna port may be associated with one set of channel training symbols, for example the CSI-RS as described above. As will be described in further detail below, the UE 110 may measure the channel response of one or multiple antenna ports to generate feedback or make decisions. For example, the UE 110 may measure the received power of antenna port 0 during a handover situation.

Therefore, in embodiments an antenna port may be the air interface perceived by UE 110. In embodiments herein, each antenna port may be formed by the eNB 105 using one or more (or all) antenna elements 135, with a beamforming weight assigned to each antenna element. In some embodiments, each antenna port may be associated with a set of beamforming weights, as described in further detail below. In embodiments described as examples below, the eNB 105 may form eight antenna ports using eight sets of weights, i.e. eight beamforming vectors. The eNB 105 may then let UEs in the cell know how the antenna ports are configured such that the UE can identify the resource in frequency and time allocated for the port.

In some embodiments, the eNB 105 may include a directional antenna with a narrow downtilt angle that uses multiple antenna elements with relatively fixed or constant beamforming weights. In the present disclosure, this directional antenna may be considered a single antenna element of the antenna elements 135 because the beamforming weights of the different antenna elements of the directional antenna may remain constant. Specifically, one or more of the antenna elements 135 may be omni-directional or uni-directional, and a directional antenna element of the antenna elements 135 may be physically implemented using multiple antenna elements with constant antenna weights.

Figure 2:
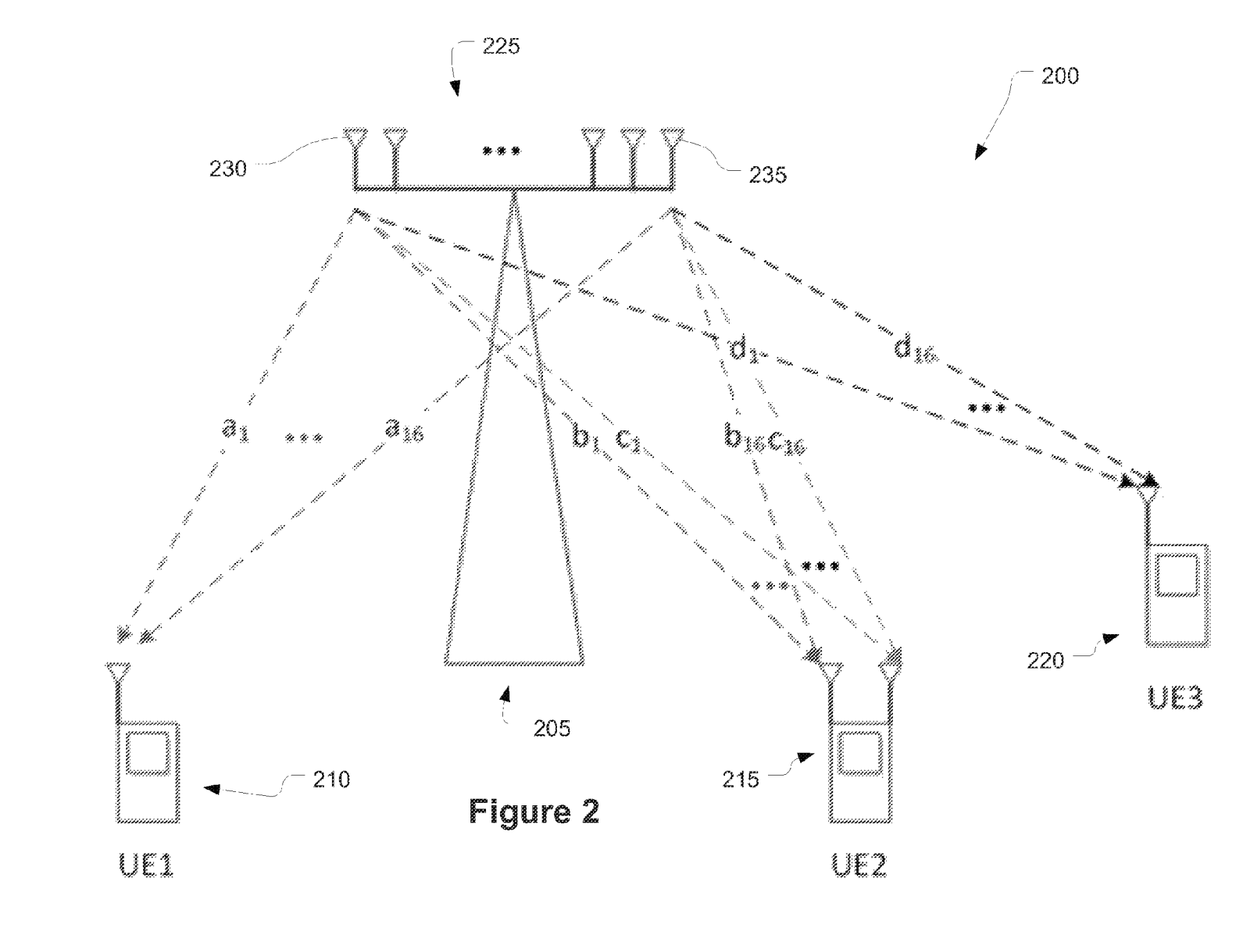
FIG. 2 depicts an example of different subspaces for FD-MIMO transmissions from an eNodeB (eNB) to a plurality of user equipment (UEs), in accordance with various embodiments.

FIG. 2 depicts an example of a network 200 including an eNB 205, which may be similar to eNB 105, and UEs 210, 215, and 220, which may be similar to UE 110. Some of the UEs, for example UEs 210 and 220, may only include a single antenna element, while other UEs such as UE 215 may include two or more antenna elements. As can be seen, the eNB 205 may include a plurality of antenna elements 225 configured to transmit signals to, or receive signals from, UEs 210, 215, and 220. In the embodiment shown in FIG. 2, the plurality of antenna elements 225 may include a first antenna element 230 through a sixteenth antenna element 235. In other embodiments, the eNB 205 may have more or less antenna elements in the plurality of antenna elements 225.

As used herein, "spaces" may refer to the vector spaces spanned by the antenna ports. For example, eNB 205 may have 16 antennas element in the plurality of antenna elements. If one antenna port is assigned to each antenna element in the plurality of antenna elements 225, then 16 antenna ports may be perceived by UEs 210, 215, and 220, and the dimension of the whole space may be 16. The 16 antenna ports may form a 16 by 1 vector space in linear algebra. The signal subspace may then be the "location" of the UEs in the whole space.

For example, the vector channel from the 16 antenna elements at the eNB to UE 210 may be denoted as $$a = \begin{bmatrix} a_1 \\ \vdots \\ a_{16} \end{bmatrix},$$

where $a_i$ represents the channel response from the ith antenna element in the plurality of antenna elements 225 of eNB 205 to the receive antenna element of the UE 210. Similarly, the UE 215 may be equipped with two receive antenna elements and have two vector channels $$b = \begin{bmatrix} b_1 \\ \vdots \\ b_{16} \end{bmatrix} \text{ and } c = \begin{bmatrix} c_1 \\ \vdots \\ c_{16} \end{bmatrix};$$

and the UE 220 may have a vector channel $$d = \begin{bmatrix} d_1 \\ \vdots \\ d_{16} \end{bmatrix}.$$

Because UE 215 has multiple vector channels, UE215 may have a matrix channel $$\begin{bmatrix} b_1 & c_1 \\ \vdots & \vdots \\ b_{16} & c_{16} \end{bmatrix}.$$

The signal subspace may be computed as follows as an example. Let the aggregated channel matrix of the active vector channels be $$H = \begin{bmatrix} a_1 & b_1 & c_1 & d_1 \\ \vdots & \vdots & \vdots & \vdots \\ a_{16} & b_{16} & c_{16} & d_{16} \end{bmatrix}.$$

Let the singular value decomposition (SVD) of H be $$H = U \begin{bmatrix} \sigma_1 & & & \\ & \sigma_2 & & \\ & & \sigma_3 & \\ & & & \sigma_4 \end{bmatrix} \begin{bmatrix} v_1 & v_2 & v_3 & v_4 \end{bmatrix}^H,$$

where $\sigma_i$ represents the singular value of the ith eigen-mode; $v_i$ is the corresponding beamforming vector of ith eigen-mode; and $v_i$ is a 16 by 1 vector with complex values.

In this embodiment, the singular values may be ordered. Specifically, $\sigma_i$ may be greater than or equal to $\sigma_j$ for any i<j. If the eNB 205 is attempting to send a relatively high amount of signal to the aggregated UE side, which in this example may consist of the antenna elements of all three of the UEs 210, 215, and 220, using one antenna beam or one beamforming vector, then $v_1$ may be the beamforming vector because it corresponds to the largest singular value $\sigma_1$.

For this example, the dimension of the whole space may be 16 because there are 16 antenna elements in the plurality of antenna elements 225 of the eNB 200 and correspondingly 16 linearly independent channels to the receive antenna elements of each UE 210, 215, and 220. If the eNB 205 is configured to only use one antenna port for channel training, then in this embodiment the eNB 205 may use the beamforming vector (or weight) $v_1$ for the antenna port. Namely, the ith entry of $v_1$ may be the beamforming weight for the ith antenna element of the eNB 205. Using $v_1$, the three UEs 210, 215, and 220 may receive the greatest amount of signal energy from the eNB 220 in total. Because in this example there may only be one beamformed signal, the three UEs 210, 215, and 220 may have to time share the beam. Similarly, if the eNB 205 is configured to use two antenna ports, then $v_1$ and $v_2$ or the linear combination of the two can be used as beamforming vectors for the two antenna ports for channel training.

The linear space spanned by vectors $v_1$ and $v_2$ within the whole space may be referred to as "subspace" or "signal subspace." If the eNB 205 sends two data streams over two beams, then there may exist two beamforming vectors within the signal subspace that can send the most energy to the aggregated UE side consisting of UEs 210, 215, and 220. The linear space within the whole space that is spanned by all the vectors orthogonal to the vectors in the signal subspace may be referred to as the null space (of the signal subspace). In this example, if eNB 205 uses two antenna ports, then the signal subspace may be spanned by $v_1$ and $v_2$ and any beamforming vectors orthogonal to $v_1$ and $v_2$ may be in the null space that may have 16−2=14 orthogonal vectors or dimensions. In other words, the null space may depend on the selection of the signal subspace. Note that in the example above $v_3$ and $v_4$ may be in the null space of $v_1$ and $v_2$ even though $v_3$ and $v_4$ may send energy to the aggregated UE side.

In the example above, the signal subspace is described with respect to beamforming vectors $v_1$ and $v_2$. However, as noted above in other embodiments the signal subspace may be described with respect to linear combinations of beamforming vectors $v_1$ and $v_2$. Specifically, as noted above beamforming vector $v_2$ may deliver the greatest amount of signal energy to UEs 210, 215, and 220. Beamforming vector $v_2$ may deliver the next greatest amount of signal energy to UEs 210, 215, and 220. In some embodiments, it may be desirable for one or more of UEs 210, 215, and 220 to perceive a relatively equal amount of signal energy from beamforming vectors $v_1$ and $v_2$. Therefore, in some embodiments beamforming vectors $v_1$ and $v_2$ may be added or subtracted from one another to produce one or more alternative beamforming vectors which may still be within the signal subspace defined by beamforming vectors $v_1$ and $v_2$, but produce a relatively equal amount of signal energy at one or more of UEs 210, 215, and 220.

Figure 3:
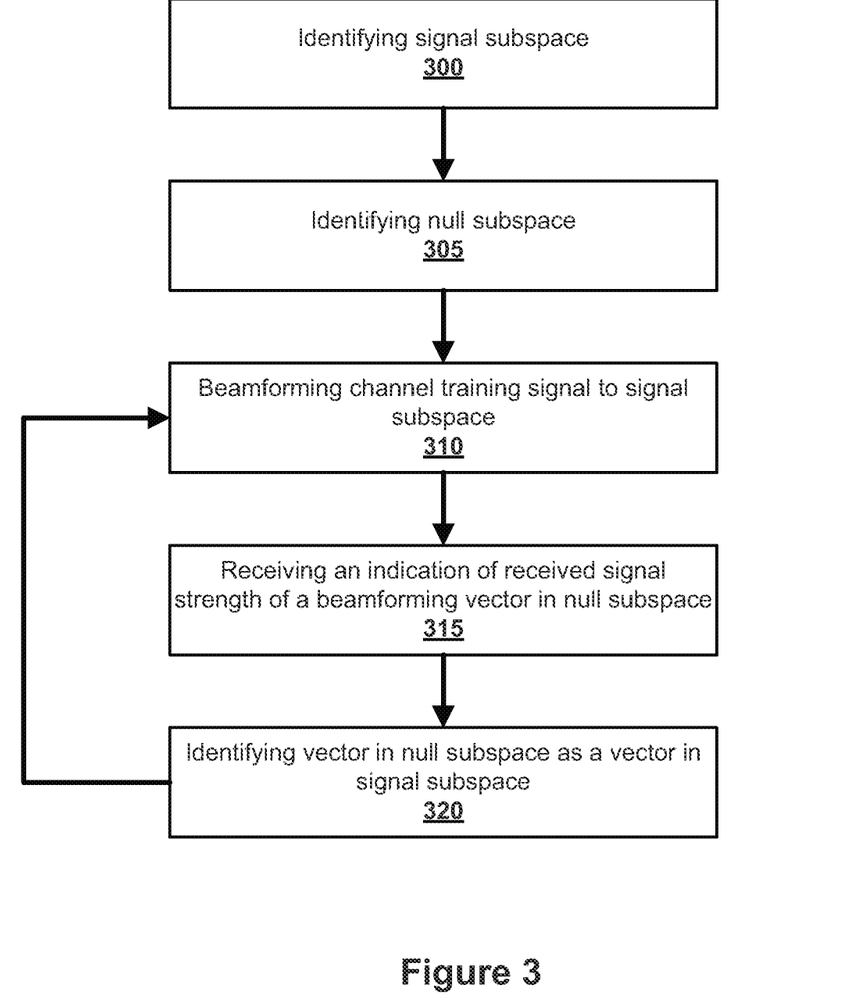
FIG. 3 depicts an example of a process flow for transmitting channel training signals, in accordance with various embodiments.

FIG. 3 depicts an example process 300 for identifying signal subspaces within a cell, and beamforming the channel training signal to the signal subspaces. Initially, the signal subspace(s) may be identified at 300. In embodiments, and as described above, a signal subspace may be identified at 300 based on previous feedback(s) from the UEs 210, 215, and 220. Specifically, the eNB such as eNB 205 may transmit a pilot signal using each possible beamforming vector in the space. Each UE, for examples UEs 210, 215, and 220, may calculate the channel response of each beamforming vector as seen by the UE. The UE may then quantize the channel responses of all received beamforming vectors using vector or scalar quantization. To continue the example above with reference to FIG. 2, four beamforming vectors ($v_1$, $v_2$, $v_3$, and $v_4$) may be selected by the eNB 205. Four pilot signals, one for each beamforming vector, may be transmitted from the eNB. If the UE has one receive antenna element, for example UEs 210 or 220, the channel response, which may indicate the received signal power of each beamformed pilot signal, of the eNB's four antenna ports may be a 4 by 1 vector with complex entries. The UE may then quantize the 4 by 1 vector jointly using vector quantization i.e. codebook quantization. The index of the quantization codeword may then be fed back to the eNB.

If the UE has m receive antenna elements, for example UE 215 with two receive antenna elements, then the channel response of the four antenna ports may be a 4 by m matrix. The UE may select a desirable k-dimensional subspace of the 4 by m matrix, for example by using SVD. In embodiments, k may represent the number of spatial streams or rank that the UE desires. This k-dimensional subspace may in some embodiments be the best k-dimensional subspace, and may be based on the UE stepping through the available numbers of spatial streams for identifying the spatial stream that may maximize the throughput of the signal received by the UE from the eNB. The selected k-dimensional subspace may be quantized to produce a quantization index, and the quantization index may be fed back to the eNB. Additionally or alternatively, the eNB may be able to identify feedback information based on, for example, downlink or uplink sounding in time-division duplexing (TDD) mode. In some embodiments the feedback may be part of or associated with a rank indicator and/or precoding matrix indicator transmission of each UE.

In some embodiments the feedback may be based on an averaging function, a summation function, or some other mathematical function performed by the UE on a pilot or beamformed signal received from the eNB. As will be explained in greater detail below, in some embodiments the signal subspace may change based on changing conditions in the cell. Therefore, it may be desirable for the fedback information from the UE to be based only on one or more signals in a given time period such as a frame, a subframe, a plurality of frames, or some other time period in which the signal subspace is constant. Otherwise, an averaging or summation function that spans a plurality of different signal subspaces may not be accurate. The combination of vectors received from the plurality of UEs may be used by the eNB to build the aggregated channel matrix H described above with respect to FIG. 2.

The principal signal subspaces may be identified as corresponding to large singular values in the singular value decomposition of the fedback beamforming vectors. Specifically, as described above, the signal subspace may be identified as the signal subspace formed by the beamforming vectors that are capable of delivering the most signal power from the eNB to the UEs. A set of beamforming vectors that sufficiently covers the selected signal subspace may then be identified for additional transmissions of channel training signals from the eNB to the one or more UEs. In embodiments, each beamforming vector may be used for beamforming one channel training signal, for example a CSI-RS signal, using a given antenna port. In some embodiments, the beamforming vectors may or may not be orthogonal to one another. In some embodiments, set selection may be designed for feedback accuracy, a given feedback codebook, or based on the detection of channel variation.

Concurrently with, or subsequent to, the identification of the signal subspace at 300, the null subspace may be identified based on the singular value decomposition of the matrix formed by the fed back beamforming vectors received at the eNB from the UE. Specifically, the null subspace may be identified based on low singular values in the singular value decomposition formed by the fed back beamforming vectors received at the eNB from the UEs. Specifically, the null subspaces may correspond to beamforming vectors that produce relatively low signal power at the UEs. The eNB may then beamform one or more channel training signals, for example the CSI-RS, to the signal subspace at 310.

In some embodiments, after the signal subspace is identified at 300 and the null subspace is identified at 305, the strength of signals beamformed to the signal subspace may change. Specifically, a beamforming vector that produces a relatively high amount of signal energy at the UEs in the cell may instead begin to produce a relatively low amount of signal energy at the UEs. This may occur, for example, if a UE such as a mobile phone, personal digital assistant (PDA), laptop, or some other type of UE moves. Additionally or alternatively, the cell may experience a change in signal reflection, propagation, or interference. Based on this change in the strength of beamforming vectors, it may be desirable for the eNB to track variation in the channel or the cell. Specifically, UEs may continuously provide feedback to the eNB, and it may be useful for the eNB to be able to dynamically modify this change in signal conditions in the cell based on the feedback from the UEs.

If the channel variation of a UE is within the signal subspace spanned by the current set of channel training signals, then the normal channel feedback procedures may be able to identify this change in the signal subspace. However, if a beamforming vector in the null subspace increases in strength, for example above the strength of a beamforming vector in the signal subspace, then there may be no feedback information from a UE that indicates this change in the beamforming vector of the null subspace because if the eNB is only beamforming signals to the signal subspace, then there may be no transmissions to the entire null subspace, or certain portions of the null subspace, by which the UE can feedback information to the eNB with regards to beamforming vectors in the null subspace.

In some embodiments it may therefore be desirable to identify whether the beamforming vectors of the signal subspace and the null subspace have changed. Therefore, in some embodiments, the eNB may receive an indication from a UE of a relatively high received signal strength of a beamforming vector in the null subspace at 315. Specifically, the eNB may occasionally beamform one or more channel training signals to the null subspace, and then analyze the singular values in the singular value decomposition formed by the fed back beamforming vectors received at the eNB from the UEs, as will be described in greater detail below. In some embodiments, because channel variation may usually be slow, the eNB may give processing priority to the beamforming feedback related to the signal subspace. Therefore, the channel training signals transmitted to the null subspace, for example by beamforming, may time share a single or a relatively low number of antenna ports so that the overhead that may result from the transmission of the channel training signals is reduced.

Based on the tracking the variation in the cell at 315, if the eNB receives feedback from one or more UEs that a transmission of a channel training signal using a beamforming vector in the null subspace has greater energy than a channel training signal beamformed using a beamforming vector in the signal subspace, then the eNB may identify the beamforming vector in the null subspace as part of the signal subspace at 320. The eNB may then return to beamforming the channel training signals in the signal subspace at 310.

To illustrate the process depicted in FIG. 3 in more detail, the following specific example may be useful. It will be understood that the following is merely an example and in other embodiments other values, equations, variables, or processes may be used. Generally, during the initial training phase, an eNB such as eNB 205 may receive feedback from one or more UEs in the cell. Based on that feedback, the signal subspace, which may contain almost all of the signal energy of the fed-back signals, and the null subspaces, which may contain a low amount or no signal energy of the fed-back signals, may be calculated at 300 and 305, respectively. The calculated information may then be used to configure future downlink training and reduce the signaling overhead by scanning the signal subspace for information from UEs with greater frequency than the null subspaces, as described above.

Initially, the variable k may represent the kth UE in a cell. t may represent a given orthogonal frequency division multiplexing (OFDM) symbol, and n may represent a subcarrier in the channel. Using this notation, the channel from an eNB to the kth UE may be written as $$H_k[n, t] = \sum_{m=1}^{M} h_{k,m}[n, t]e_m = \sum_{m=1}^{M} g_{k,m}[n, t]w_m \cdot H_k$$

may be, for example, a 16×1 vector in cells where the eNB includes 16 antenna elements, and there is only a single UE, and it may represent the spatial signature from the eNB to the UE that is obtained through uplink feedback. M may be the dimensionality of the channel, i.e. the number of subspaces in the cell. $h_{k,m}[n,t]$ may be the estimated channel, i.e.

the channel response, for the kth UE on a given subcarrier n in OFDM symbol t. $e_m$ may be a vector equal to, for example (0, 0, . . . 0, 1, 0, 0, . . . 0) with the 1 in the mth position and zeroes elsewhere, and represent the unit vector pointing to the mth direction. $g_{k,m}[n,t]$ may represent the channel coefficient for the kth UE in the mth dimension in OFDM symbol t and subcarrier n. $w_m$ my represent the unit norm vector for the mth dimension, i.e. the normalization weighting factor.

As noted above, M may represent the dimensionality of the channel, i.e. the total number of subspaces in the cell. It may be desirable to compress the channel and reduce the dimensionality from M to D<M. In other words, all of the subspaces in the cell may have a dimensionality M, and the signal subspace may have a dimensionality D<M In order to reduce the dimensionality of the channel, it may be desirable to find the optimal basis $w_1, \ldots, w_m$ such that $g_{k,m}[n]$ is approximately equal to 0 when m>D. Then, for d=1, 2, . . . , D, coefficients $g_{k,m}[n,t]$ may be given by $g_{k,d}[n,t]=w_d^H H_k[n,t]$.

One result of reducing the dimensionality from M to D<M may be that, instead of utilizing M reference signals to estimate the channel in the original M-dimensional space and feeding back that information, the eNB may only employ D reference signals. By beamforming these reference signals with the weights $w_1, \ldots, w_D$, each UE may estimate the coefficient $g_{k,d}[n]$ directly and send that information to the eNB.

By allowing the UE to estimate the coefficient $g_{k,d}[n]$ directly, the overhead of transmitting the channel training signals may be reduced by a factor of D/M. Additionally, because UEs may not need to actually know the beamforming vectors used to generate the beamformed signals in order to receive the beamformed signals, the process of reducing the dimensionality of the channel from M to D may be completely transparent to the UEs. In other words, the UEs may not receive an indication that channel training signals are being beamformed only to the signal subspace rather than to the full space of the cell. However, as described in further detail below, in some embodiments it may be useful for one or more of the UEs to receive an antenna port configuration schedule from the eNB so that the UE is able to identify, for feedback purposes, when the subspace configuration may remain relatively constant.

After receiving the feedback from the UE, the eNB may identify the signal and null subspaces in the cell. Specifically, the channel covariance matrix may be estimated at the end of the qth training phase (that is, the qth time that the channel training signals are transmitted from the eNB) as $$R_q \approx \frac{1}{KTN} \sum_{k=1}^{K} \sum_{t=(q-1)T+1}^{qT} \sum_{n=1}^{N} \left( \frac{\hat{H}_k[t,n]}{\|\hat{H}_k[t,n]\|} \right) \left( \frac{\hat{H}_k[t,n]}{\|\hat{H}_k[t,n]\|} \right)^H = U_q \Lambda_q U_q^H$$

where $R_q$ is the channel covariance matrix in the qth training phase. T may be the length of the training period for sample covariance matrix calculations at the eNB in terms of OFDM symbols. $\hat{H}_k$ may be the estimated channel for the kth UE. K may be the total number of UEs in the cell. N may be the total number of subcarriers used by the eNB. Superscript H may represent the transpose conjugate mathematical operation. $U_q$ may be an M×M unitary matrix, and $\Lambda_q$ may be a diagonal matrix of eigenvalues $\lambda_{q,1}, \ldots, \lambda_{q,D}$. In general, $U_q \Lambda_q U_q^H$ may be referred to as the SVD of the matrix formed by the feedback beamforming vectors received by the eNB from the UEs, and the eigenvalues may be the singular value corresponding to each eigenvector direction. An eigenvector may be a specific example of a beamforming vector. In other words, the eigenvalues from $\lambda_{q,1}$ to $\lambda_{q,D}$ may represent the strength of the signal received from signals beamformed using beamforming vectors in the signal subspaces, and the eigenvalues $\lambda_{q,D+1}$ to $\lambda_{q,M}$ may represent the strength of the signals, or lack thereof, received from signals beamformed using beamforming vectors in the null subspaces. Without loss of generality, it may be assumed that $\lambda_{q,1} \geq \ldots \geq \lambda_{q,D} \geq \lambda_{q,D+1}$ which may be approximately equal to $\lambda_M$, which may be approximately equal to 0. Therefore, the basis for each signal subspace in the D-dimensional channel may be $\{u_q,1, \ldots, u_{q,D}\}$ where $u_{q,D}$ is the dth column of the unitary matrix $U_q$, that is the eigenvector corresponding to the dth strongest eigenvalue. These strongest eigenvectors may now be used to beamform reference signals to the signal subspace at 310.

However, as mentioned before, the signal subspace may change and one or more beamforming vectors in the null subspace may produce a better channel response than one or more beamforming vectors in the signal subspace. In order to track these movements, and the resultant changes in the channel, it may be desirable to occasionally scan at 315 one or more null subspaces that are orthogonal to the D-dimension signal subspace to identify new beamforming vector or vectors with components in the null subspaces that produce a better channel response than one or more beamforming vectors in the signal subspace. Specifically, the new beamforming vector may include two components. The first component may be in the existing subspace spanned by one or more vectors of the signal subspace. The other component may be in the null space, and may be viewed as a correction or adjustment to the component in the existing subspace. In embodiments, the correction component may be smaller than the component in the signal subspace. Because the basis for each signal subspace in the D-dimensional channel may be $\{u_{q,1}, \ldots, u_{q,D}\}$, the basis for each null subspace in the M-dimensional channel may be $\{u_{q,D+1}, \ldots, u_{q,M}\}$.

In order to scan the null subspaces, the eNB may beamform D-r reference signals with $u_{q,1}, \ldots, u_{q,D-r}$ and the remaining r reference signals may be beamformed with r vectors selected from $u_{q,D-r+1}, \ldots, u_{q,M}$ in order to cover the null subspaces of the M-dimensional space. UEs that receive one or more of the r reference signals may estimate and quantize their channel direction in the new space as $$\tilde{g}_{k,d}[n,t] = \frac{u_{q,d}^H H_k[n,t]}{\|u_{q,d}^H H_k[n,t]\|}$$

where d=1, 2, . . . , D. The estimated and quantized channel direction may be transmitted from the UE to the eNB along with a channel quality indicator (CQI) transmission (which may represent a signal to interference plus noise ratio (SINR)) to the eNB. The eNB may reconstruct the channel direction in the original M dimensional space as $$\hat{H}_k[t,n] \approx \sqrt{SINR_k[t,n]} \sum_{d=1}^{D-1} \tilde{g}_{k,d}[n,t] u_{k,d}$$

to identify the relative strength of signals received in the null subspace at 315. Based on these reconstructed channel directions, the eNB may be able to identify one or more of the beamforming vectors in the null subspaces as part of the signal subspace at 320.

Results of a simulated test using one embodiment of the present disclosure are presented below in Tables 1 and 2. In these simulations, it was assumed that an eNB such as eNB 205 included 16 antenna elements with eight antenna ports. The first seven antenna ports were selected to transmit channel training signals to the signal subspace, while the eighth antenna port was selected to periodically beamform a channel training signal to the null subspace. Specifically, the transmissions of the first seven channel training signals were weighted with the seven eigenvectors corresponding to the seven strongest eigenvalues to produce beamformed channel training signals. These seven eigenvectors may be considered to be in the signal subspace. The seven beamformed channel training signals were then respectively transmitted using the first seven antenna ports of the eNB. The eighth port was selected to time share the nine remaining eigenvectors, i.e. the beamforming vectors in the null subspace, that were orthogonal to the seven eigenvectors used to produce the beamformed channel training signals. Every five to ten frames, the eNB would update the first seven beamforming vectors, while the eighth eigenvector for tracking would be updated more often for time sharing the single port. In other words, while the first seven antenna ports transmitted the beamformed seven channel training signals produced by the seven strongest eigenvectors in each frame, the eighth port would sequentially transmit beamformed channel training signals produced using the ninth through sixteenth eigenvectors one at a time in respective frames (i.e. through time sharing of the eighth port).

Tables 1 and 2, below, depict simulated sample results for a 4×4 antenna configuration and a 16×1 antenna configuration, respectively. Specifically, Tables 1 and 2 depict the average cell throughput in Megabits per second (Mbps) and cell edge user throughput in kilobits per second per UE (kbps/UE). Tables 1 and 2 depicts results for a baseline measurement where the process of FIG. 3 is not performed, a subspace tracking (SS) process with scalar quantization wherein the channel direction is quantized by a scalar quantizer with 3 bits per real dimension, an SS singular value decomposition (SVD) process wherein the channel direction is obtained by SVD, and a frequency division (FD) zero-forcing beamforming (ZFBF) process based on the instantaneous values of the effective channel where no channel compression is performed.

TABLE 1

Simulation Results for 4x4 Antenna Configuration

|  | Average Cell Throughput (Mbps) | Cell edge User Throughput (kbps/UE) |
| --- | --- | --- |
| Baseline | 19.57 | 671 |
| SS, Scalar Quant. | 23.29 | 757 |
| SS, SVD | 26.43 | 810 |
| FD ZFBF, SVD | 27.41 | 852 |

TABLE 2

Simulation Results for 16x1 Antenna Configuration

|  | Average Cell Throughput (Mbps) | Cell edge User Throughput (kbps/UE) |
| --- | --- | --- |
| Baseline | 19.57 | 671 |
| SS, Scalar Quant. | 31.46 | 1130 |
| SS, SVD | 36.76 | 1283 |
| FD ZFBF, SVD | 44.81 | 1591 |

In some embodiments, the process described above with respect to FIGS. 2 and 3 may cause the channel training signals to vary with time. For example, the channel reference signal (CRS) and CSI-RS may be beamformed on a vector that may vary with time. Therefore, in embodiments it may be useful for the UE to know the time boundary when the beamforming vectors of the channel training signals transmitted from the eNB in the signal subspace change. By knowing this time boundary, the UE may avoid providing feedback to the eNB regarding an average of the channel training signal across two different periods with two differently beamformed channel training signals.

Specifically, as noted above in some embodiments the signal subspace may change based on variations in the cell, positions of the UEs in the cell, or other factors. Additionally, as described above the signal subspace may be constructed based on information fedback from UEs in the cell. However, if the signal conditions in the cell are changing, then based on this feedback the beamforming vectors in the signal subspace and the null subspace may change.

As noted above, in some embodiments the feedback may be based on one or more averaging, summation or some other mathematical operations of a UE of signals received from the eNB. However, in some embodiments if the beamforming vectors in the signal subspace and null subspace change, then information averaged over the change in signal subspace may not be desirable. Therefore, it may be useful for the UEs in the cell to not perform averaging or other mathematical operations that span two different signal subspace configurations. Specifically, in some embodiments the signal subspace may change with each radio frame, radio subframe, or plurality of radio frames, or according to some other time period. Therefore, an averaging, summation, or other mathematical operation of a UE may be limited to only a single time period rather than a plurality of time periods.

Therefore, in some embodiments the eNB may transmit an antenna port configuration schedule to one or more UEs. In some embodiments, the eNB may beamform the antenna port configuration schedule to one or more of the UEs, while in other embodiments the eNB may omnicast the antenna port configuration schedule to UEs in the cell. In some embodiments, the antenna port configuration schedule may include one or more of a start time at which the signal subspace configuration may remain constant, a duration at which the signal subspace configuration may remain constant, and/or an end time at which the signal subspace configuration may remain constant. In some embodiments the antenna port configuration schedule may be demarcated according to specific times, while in other embodiments the antenna port configuration schedule may indicate one or more known periods such as radio frames, subframes, etc. In some embodiments, the antenna port configuration schedule may include one or more of a start time at which the antenna port for the null space configuration may remain constant, a duration at which the null space configuration may remain constant, and/or an end time at which the null space may remain constant. In addition, the configuration information about how the large null space is stepped through by a small number of antenna ports may be sent by the eNB. By knowing the port scheduling of the null space, the UE may not average signals across two differently beamformed ports for the null space.

Figure 4:
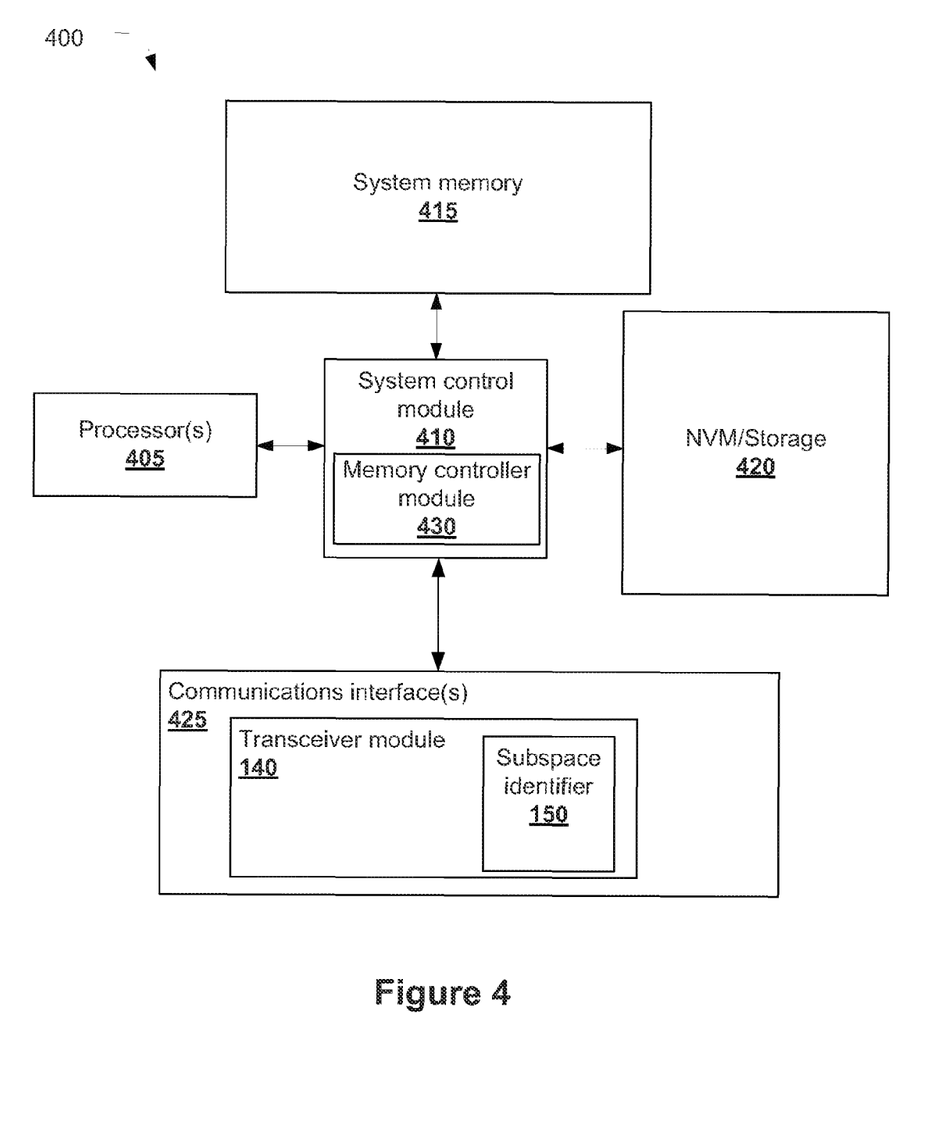
FIG. 4 schematically illustrates an example system that may be used to practice various embodiments described herein.

Embodiments of the present disclosure may be implemented into a system using any suitable hardware and/or software to configure as desired. FIG. 4 schematically illustrates an example system 400 that may be used to practice various embodiments described herein. FIG. 4 illustrates, for one embodiment, an example system 400 having one or more processor(s) 405, system control module 410 coupled to at least one of the processor(s) 405, system memory 415 coupled to system control module 410, non-volatile memory (NVM)/storage 420 coupled to system control module 410, and one or more communications interface(s) 425 coupled to system control module 410.

In some embodiments, the system 400 may be capable of functioning as the UEs 110, 210, 215, or 220 as described herein. In other embodiments, the system 400 may be capable of functioning as the eNB 105 or 205 depicted in FIG. 1 or 2 or any one of the other described embodiments. In some embodiments, the system 400 may include one or more computer-readable media (e.g., system memory or NVM/storage 420) having instructions and one or more processors (e.g., processor(s) 405) coupled with the one or more computer-readable media and configured to execute the instructions to implement a module to perform actions described herein.

System control module 410 for one embodiment may include any suitable interface controllers to provide for any suitable interface to at least one of the processor(s) 405 and/or to any suitable device or component in communication with system control module 410.

System control module 410 may include memory controller module 430 to provide an interface to system memory 415. The memory controller module 430 may be a hardware module, a software module, and/or a firmware module.

System memory 415 may be used to load and store data and/or instructions, for example, for system 400. System memory 415 for one embodiment may include any suitable volatile memory, such as suitable DRAM, for example. In some embodiments, the system memory 415 may include double data rate type four synchronous dynamic random-access memory (DDR4 SDRAM).

System control module 410 for one embodiment may include one or more input/output (I/O) controller(s) to provide an interface to NVM/storage 420 and communications interface(s) 425.

The NVM/storage 420 may be used to store data and/or instructions, for example. NVM/storage 420 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 420 may include a storage resource physically part of a device on which the system 400 may be installed or it may be accessible by, but not necessarily a part of, the device. For example, the NVM/storage 420 may be accessed over a network via the communications interface(s) 525.

Communications interface(s) 425 may provide an interface for system 400 to communicate over one or more network(s) and/or with any other suitable device. The system 400 may wirelessly communicate with the one or more components of the wireless network in accordance with any of one or more wireless network standards and/or protocols. In some embodiments the communications interface(s) 425 may include the transceiver module 140 and/or subspace identifier 150 of FIG. 1.

For one embodiment, at least one of the processor(s) 405 may be packaged together with logic for one or more controller(s) of system control module 410, e.g., memory controller module 430. For one embodiment, at least one of the processor(s) 405 may be packaged together with logic for one or more controllers of system control module 410 to form a System in Package (SiP). For one embodiment, at least one of the processor(s) 405 may be integrated on the same die with logic for one or more controller(s) of system control module 410. For one embodiment, at least one of the processor(s) 405 may be integrated on the same die with logic for one or more controller(s) of system control module 410 to form a System on Chip (SoC).

In some embodiments the processor(s) 405 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or GPS circuitry (not shown).

In various embodiments, the system 400 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 400 may have more or less components, and/or different architectures. For example, in some embodiments, the system 400 includes one or more of a camera, a keyboard, liquid crystal display (LCD) screen (including touch screen displays), non-volatile memory port, multiple antenna elements, graphics chip, application-specific integrated circuit (ASIC), and speakers.

Methods and apparatuses are provided herein for Example 1 may include an eNodeB (eNB) comprising: a plurality of antenna ports with a plurality of antenna elements; subspace identification circuitry coupled with the plurality of antenna elements, the subspace identification circuitry to: identify, based on feedback information, a plurality of beamforming weights for one or multiple antenna ports wherein a number of the antenna ports is less than a number of the plurality of antenna elements; and assign a beamforming weight in the plurality of beamforming weights to an antenna in the plurality of antenna elements; and transmitter circuitry coupled with the subspace identification circuitry, the transmitter circuitry to: beamform a channel training signal allocated for the antenna port with the beamforming weights; and transmit an antenna port configuration schedule from the plurality of antennas.

Example 2 may include the eNB of example 1, wherein the feedback information is based on downlink sounding, or uplink sounding, or a signal received from a user equipment (UE).

Example 3 may include the eNB of example 1, wherein the antenna port configuration schedule includes an indication of a time period where the beamforming weights will not change.

Example 4 may include the eNB of any of examples 1-3, wherein: the feedback information includes a first indication of a magnitude or phase of a first received signal of a first beamformed signal produced with a first beamforming vector and a second indication of a magnitude or phase of a second received signal of a second beamformed signal produced with a second beamforming vector; the subspace identification circuitry is further to identify a signal subspace that substantially includes the first beamforming vector based at least in part on the first indication, and a null subspace that substantially includes the second beamforming vector based at least in part on the second indication; and the transmitter circuitry is further to beamform the channel training signal to the signal subspace.

Example 5 may include the eNB of example 4, wherein the first received signal energy is higher than the second received signal energy.

Example 6 may include the eNB of example 4, wherein the channel training signal is a first channel training signal and the transmitter circuitry is further to beamform a second channel training signal to only a portion of the null subspace.

Example 7 may include the eNB of example 6, further comprising receiver circuitry coupled with the transmitter circuitry, the receiver circuitry to receive, in response to the transmission of the additional training signal in the null subspace, a second feedback that includes a third indication of a magnitude or phase of a third received signal of a third beamformed signal produced with a third beamforming vector in the null subspace.

Example 8 may include the eNB of example 6, wherein the signal subspace is a first signal subspace and the subspace identification circuitry is further to identify a second signal subspace based at least in part on the third indication, wherein the second signal subspace includes the third beamforming vector.

Example 9 may include a method comprising: identifying, by an eNodeB (eNB), a first signal subspace in a space based at least in part on a first indication of a magnitude or a phase of a first received signal of a first beamforming signal using a first beamforming vector in the first signal subspace, the first signal subspace substantially including the first beamforming vector; identifying, by the eNB, a null subspace in the space based at least in part on a second indication of a magnitude or a phase of a second received signal of a second beamforming signal using a second beamforming vector in the null subspace, the null subspace substantially including the second beamforming vector; and beamforming, from an antenna port of the eNB, a channel training signal to the first signal subspace.

Example 10 may include the method of example 9, further comprising: receiving, by the eNB after the beamforming of the channel training signal, a third indication of a magnitude or a phase of a third received signal of a third beamforming signal using a third beamforming vector in the null subspace, the null subspace including a third beamforming vector; and identifying, by the eNB, a second signal subspace based at least in part on the third indication, the second signal subspace including the third beamforming vector.

Example 11 may include the method of example 10, wherein the channel training signal is a first channel training signal and the third indication is based at least in part on beamforming, by the eNB, a second channel training signal to at least a portion of the null subspace.

Example 12 may include the method of example 9, wherein the first signal subspace is based at least in part on a singular value decomposition of the first indication.

Example 13 may include the method of example 9, wherein the first received signal strength is greater than the second received signal strength.

Example 14 may include the method of any of examples 9-13, wherein the first indication, second indication, and third indication are received by the eNB from a user equipment (UE).

Example 15 may include the method of any of examples 9-13, wherein the antenna port includes a plurality of antenna elements of the eNB.

Example 16 may include the method of any of examples 9-13, wherein the channel training signal is a channel state information-reference signal (CSI-RS) signal.

Example 17 may include one or more computer readable media comprising instructions which, when executed by one or more processors of an eNodeB (eNB), cause the eNB to: identify a first signal subspace in a space based at least in part on a first indication of a magnitude or a phase of a first received signal of a first beamforming signal using a first beamforming vector in the signal subspace, the first signal subspace substantially including a first beamforming vector; identify a null subspace in the space based at least in part on a second indication of a magnitude or a phase of a second received signal of a second beamforming signal using a second beamforming vector in the null subspace, the null subspace substantially including the second beamforming vector; and beamform a channel training signal to the first signal subspace.

Example 18 may include the one or more computer readable media of example 17, further comprising instructions to: obtain, after the beamform of the channel training signal, a third indication of a magnitude or a phase of a third received signal of a third beamforming signal using a third beamforming vector in the null subspace, the null subspace including a third beamforming vector; and identify a second signal subspace based at least in part on the third indication, the second signal subspace including the third beamforming vector.

Example 19 may include the one or more computer readable media of examples 17 or 18, wherein the first received signal strength is greater than the second received signal strength.

Example 20 may include an eNodeB comprising: the one or more computer readable media of any of examples 17-19; and one or more processors coupled with the one or more computer-readable media and configured to execute the instructions.

Example 21 may include a method comprising: identifying, by an eNodeB (eNB) based on feedback information, a plurality of beamforming weights for one or multiple antenna ports, wherein the one or multiple antenna ports have a plurality of antenna elements, and a number of the antenna ports is less than a number of the plurality of antenna elements; assigning, by the eNB, a beamforming weight in the plurality of beamforming weights to an antenna in the plurality of antenna elements; beamforming, from the eNB, a channel training signal allocated for the antenna port with the beamforming weights; and transmitting, from the eNB, an antenna port configuration schedule from the plurality of antennas.

Example 22 may include the method of example 21, wherein the feedback information is based on downlink sounding, or uplink sounding, or a signal received from a user equipment (UE).

Example 23 may include the method of example 21, wherein the antenna port configuration schedule includes an indication of a time period where the beamforming weights will not change.

Example 24 may include the method of any of examples 21-23, wherein the feedback information includes a first indication of a magnitude or phase of a first received signal of a first beamformed signal produced with a first beamforming vector and a second indication of a magnitude or phase of a second received signal of a second beamformed signal produced with a second beamforming vector and the method further comprises: identifying, by the eNB, a signal subspace that substantially includes the first beamforming vector based at least in part on the first indication, and a null subspace that substantially includes the second beamforming vector based at least in part on the second indication; and beamforming, from the eNB, the channel training signal to the signal subspace.

Example 25 may include the method of example 24, wherein the first received signal energy is higher than the second received signal energy.

Example 26 may include the method of example 24, wherein the channel training signal is a first channel training signal and the method further comprises beamforming, from the eNB, a second channel training signal to only a portion of the null subspace.

Example 27 may include the method of example 26, further comprising receiving, by the eNB and in response to the transmission of the additional training signal in the null subspace, a second feedback that includes a third indication of a magnitude or phase of a third received signal of a third beamformed signal produced with a third beamforming vector in the null subspace.

Example 28 may include the method of example 26, wherein the signal subspace is a first signal subspace and the method further comprising identifying, by the eNB, a second signal subspace based at least in part on the third indication, wherein the second signal subspace includes the third beamforming vector.

Example 29 may include an apparatus comprising: means to identify, based on feedback information, a plurality of beamforming weights for one or multiple antenna ports, wherein the one or multiple antenna ports have a plurality of antenna elements, and a number of the antenna ports is less than a number of the plurality of antenna elements; means to assign a beamforming weight in the plurality of beamforming weights to an antenna in the plurality of antenna elements; means to beamform a channel training signal allocated for the antenna port with the beamforming weights; and means to transmit an antenna port configuration schedule from the plurality of antennas.

Example 30 may include the apparatus of example 29, wherein the feedback information is based on downlink sounding, or uplink sounding, or a signal received from a user equipment (UE).

Example 31 may include the apparatus of example 29, wherein the antenna port configuration schedule includes an indication of a time period where the beamforming weights will not change.

Example 32 may include the apparatus of any of examples 29-31, wherein the feedback information includes a first indication of a magnitude or phase of a first received signal of a first beamformed signal produced with a first beamforming vector and a second indication of a magnitude or phase of a second received signal of a second beamformed signal produced with a second beamforming vector and the apparatus further comprises: means to identify a signal subspace that substantially includes the first beamforming vector based at least in part on the first indication, and a null subspace that substantially includes the second beamforming vector based at least in part on the second indication; and means to beamform the channel training signal to the signal subspace.

Example 33 may include the apparatus of example 32, wherein the first received signal energy is higher than the second received signal energy.

Example 34 may include the apparatus of example 32, wherein the channel training signal is a first channel training signal and the apparatus further comprises means to beamform a second channel training signal to only a portion of the null subspace.

Example 35 may include the apparatus of example 34, further comprising means to receive, in response to the transmission of the additional training signal in the null subspace, a second feedback that includes a third indication of a magnitude or phase of a third received signal of a third beamformed signal produced with a third beamforming vector in the null subspace.

Example 36 may include the apparatus of example 34, wherein the signal subspace is a first signal subspace and the apparatus further comprises means to identify a second signal subspace based at least in part on the third indication, wherein the second signal subspace includes the third beamforming vector.

Example 37 may include one or more computer readable media comprising instructions configured, upon execution of the instructions by a processor, to: identify, based on feedback information, a plurality of beamforming weights for one or multiple antenna ports, wherein the one or multiple antenna ports have a plurality of antenna elements, and a number of the antenna ports is less than a number of the plurality of antenna elements; assign a beamforming weight in the plurality of beamforming weights to an antenna in the plurality of antenna elements; beamform a channel training signal allocated for the antenna port with the beamforming weights; and transmit an antenna port configuration schedule from the plurality of antennas.

Example 38 may include the one or more computer readable media of example 37, wherein the feedback information is based on downlink sounding, or uplink sounding, or a signal received from a user equipment (UE).

Example 39 may include the one or more computer readable media of example 37, wherein the antenna port configuration schedule includes an indication of a time period where the beamforming weights will not change.

Example 40 may include the one or more computer readable media of any of examples 37-39, wherein the feedback information includes a first indication of a magnitude or phase of a first received signal of a first beamformed signal produced with a first beamforming vector and a second indication of a magnitude or phase of a second received signal of a second beamformed signal produced with a second beamforming vector and further comprising instructions to: identify a signal subspace that substantially includes the first beamforming vector based at least in part on the first indication, and a null subspace that substantially includes the second beamforming vector based at least in part on the second indication; and beamform the channel training signal to the signal subspace.

Example 41 may include the one or more computer readable media of example 40, wherein the first received signal energy is higher than the second received signal energy.

Example 42 may include the one or more computer readable media of example 40, wherein the channel training signal is a first channel training signal and further comprising instructions to beamform a second channel training signal to only a portion of the null subspace.

Example 43 may include the one or more computer readable media of example 42, further comprising instructions to receive, in response to the transmission of the additional training signal in the null subspace, a second feedback that includes a third indication of a magnitude or phase of a third received signal of a third beamformed signal produced with a third beamforming vector in the null subspace.

Example 44 may include the one or more computer readable media of example 42, wherein the signal subspace is a first signal subspace and further comprising instructions to identify a second signal subspace based at least in part on the third indication, wherein the second signal subspace includes the third beamforming vector.

Example 45 may include an apparatus comprising: means to identify a first signal subspace in a space based at least in part on a first indication of a magnitude or a phase of a first received signal of a first beamforming signal using a first beamforming vector in the first signal subspace, the first signal subspace substantially including the first beamforming vector; means to identify a null subspace in the space based at least in part on a second indication of a magnitude or a phase of a second received signal of a second beamforming signal using a second beamforming vector in the null subspace, the null subspace substantially including the second beamforming vector; and means to beamform, from an antenna port, a channel training signal to the first signal subspace.

Example 46 may include the apparatus of example 45, further comprising: means to receive, after the beamforming of the channel training signal, a third indication of a magnitude or a phase of a third received signal of a third beamforming signal using a third beamforming vector in the null subspace, the null subspace including a third beamforming vector; and means to identify a second signal subspace based at least in part on the third indication, the second signal subspace including the third beamforming vector.

Example 47 may include the apparatus of example 46, wherein the channel training signal is a first channel training signal and the third indication is based at least in part on a beamforming, by the eNB, of a second channel training signal to at least a portion of the null subspace.

Example 48 may include the apparatus of example 45, wherein the first signal subspace is based at least in part on a singular value decomposition of the first indication.

Example 49 may include the apparatus of example 45, wherein the first received signal strength is greater than the second received signal strength.

Example 50 may include the apparatus of any of examples 45-49, wherein the first indication, second indication, and third indication are received from a user equipment (UE).

Example 51 may include the apparatus of any of examples 45-49, wherein the antenna port includes a plurality of antenna elements of the eNB.

Example 52 may include the apparatus of any of examples 45-49, wherein the channel training signal is a channel state information-reference signal (CSI-RS) signal.

Example 53 may include an eNode B (eNB) comprising: subspace identification circuitry to: identify a first signal subspace in a space based at least in part on a first indication of a magnitude or a phase of a first received signal of a first beamforming signal using a first beamforming vector in the first signal subspace, the first signal subspace substantially including the first beamforming vector; and identify a null subspace in the space based at least in part on a second indication of a magnitude or a phase of a second received signal of a second beamforming signal using a second beamforming vector in the null subspace, the null subspace substantially including the second beamforming vector; and transmitter circuitry coupled with the subspace identification circuitry, the transmitter circuitry to beamform, from an antenna port of the eNB, a channel training signal to the first signal subspace.

Example 54 may include the eNB of example 53, further comprising: receiver circuitry coupled with the transmitter circuitry, the receiver circuitry to receive, after the beamforming of the channel training signal, a third indication of a magnitude or a phase of a third received signal of a third beamforming signal using a third beamforming vector in the null subspace, the null subspace including a third beamforming vector; and the subspace identification circuitry is further to identify a second signal subspace based at least in part on the third indication, the second signal subspace including the third beamforming vector.

Example 55 may include the eNB of example 54, wherein the channel training signal is a first channel training signal and the third indication is based at least in part on a beamforming, by the eNB, of a second channel training signal to at least a portion of the null subspace.

Example 56 may include the eNB of example 53, wherein the first signal subspace is based at least in part on a singular value decomposition of the first indication.

Example 57 may include the eNB of example 53, wherein the first received signal strength is greater than the second received signal strength.

Example 58 may include the eNB of any of examples 53-57, wherein the first indication, second indication, and third indication are received from a user equipment (UE).

Example 59 may include the eNB of any of examples 53-57, wherein the antenna port includes a plurality of antenna elements of the eNB.

Example 60 may include the eNB of any of examples 53-57, wherein the channel training signal is a channel state information-reference signal (CSI-RS) signal.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:
1. An eNodeB (eNB) comprising:
  a plurality of antenna ports with a plurality of antenna elements;
  subspace identification circuitry coupled with the plurality of antenna elements, the subspace identification circuitry to:
    identify, based on feedback information, a plurality of beamforming weights for one or multiple antenna ports wherein a number of the antenna ports is less than a number of the plurality of antenna elements; and
    assign a beamforming weight in the plurality of beamforming weights to an antenna in the plurality of antenna elements; and
  transmitter circuitry coupled with the subspace identification circuitry, the transmitter circuitry to:

beamform a channel training signal allocated for the one or multiple antenna ports with the assigned beamforming weight; and transmit an antenna port configuration schedule from the plurality of antenna elements.

2. The eNB of claim 1, wherein the feedback information is based on downlink sounding, or uplink sounding, or a signal received from a user equipment (UE).

3. The eNB of claim 1, wherein the antenna port configuration schedule includes an indication of a time period where the beamforming weights will not change.

4. The eNB of claim 1, wherein:
the feedback information includes a first indication of a magnitude or phase of a first received signal of a first beamformed signal produced with a first beamforming vector and a second indication of a magnitude or phase of a second received signal of a second beamformed signal produced with a second beamforming vector;
the subspace identification circuitry is further to identify a signal subspace that includes the first beamforming vector based at least in part on the first indication, and a null subspace that includes the second beamforming vector based at least in part on the second indication; and
the transmitter circuitry is further to beamform the channel training signal to the signal subspace.

5. The eNB of claim 4, wherein the magnitude of the first received signal is higher than the magnitude of the second received signal.

6. The eNB of claim 4, wherein the channel training signal is a first channel training signal and the transmitter circuitry is further to beamform a second channel training signal to only a portion of the null subspace.

7. The eNB of claim 6, further comprising receiver circuitry coupled with the transmitter circuitry, the receiver circuitry to receive, in response to the transmission of the second channel training signal in the null subspace, a second feedback that includes a third indication of a magnitude or phase of a third received signal of a third beamformed signal produced with a third beamforming vector in the null subspace.

8. The eNB of claim 7, wherein the signal subspace is a first signal subspace and the subspace identification circuitry is further to identify a second signal subspace based at least in part on the third indication, wherein the second signal subspace includes the third beamforming vector.

9. A method comprising:
identifying, by an eNodeB (eNB), a first signal subspace in a space based at least in part on a first indication of a magnitude or a phase of a first received signal of a first beamforming signal using a first beamforming vector in the first signal subspace, the first signal subspace including the first beamforming vector; and
identifying, by the eNB, a null subspace in the space based at least in part on a second indication of a magnitude or a phase of a second received signal of a second beamforming signal using a second beamforming vector in the null subspace, the null subspace including the second beamforming vector; and
beamforming, from an antenna port of the eNB, a channel training signal to the first signal subspace.

10. The method of claim 9, further comprising:
receiving, by the eNB after the beamforming of the channel training signal, a third indication of a magnitude or a phase of a third received signal of a third beamforming signal using a third beamforming vector in the null subspace, the null subspace including the third beamforming vector; and
identifying, by the eNB, a second signal subspace based at least in part on the third indication, the second signal subspace including the third beamforming vector.

11. The method of claim 10, wherein the channel training signal is a first channel training signal and the third indication is based at least in part on beamforming, by the eNB, a second channel training signal to at least a portion of the null subspace.

12. The method of claim 10, wherein the first indication, second indication, and third indication are received by the eNB from a user equipment (UE).

13. The method of claim 9, wherein the first signal subspace is based at least in part on a singular value decomposition of the first indication.

14. The method of claim 9, wherein the magnitude of the first received signal is greater than the magnitude of the second received signal.

15. The method of claim 9, wherein the antenna port includes a plurality of antenna elements of the eNB.

16. The method of claim 9, wherein the channel training signal is a channel state information-reference signal (CSI-RS) signal.

17. One or more non-transitory computer-readable media comprising instructions which, when executed by one or more processors of an eNodeB (eNB), cause the eNB to:
identify a first signal subspace in a space based at least in part on a first indication of a magnitude or a phase of a first received signal of a first beamforming signal using a first beamforming vector in the first signal subspace, the first signal subspace including a first beamforming vector;
identify a null subspace in the space based at least in part on a second indication of a magnitude or a phase of a second received signal of a second beamforming signal using a second beamforming vector in the null subspace, the null subspace including the second beamforming vector; and
beamform a channel training signal to the first signal subspace.

18. The one or more non-transitory computer readable media of claim 17, further comprising instructions to:
obtain, after the beamform of the channel training signal, a third indication of a magnitude or a phase of a third received signal of a third beamforming signal using a third beamforming vector in the null subspace, the null subspace including the third beamforming vector; and
identify a second signal subspace based at least in part on the third indication, the second signal subspace including the third beamforming vector.

19. The one or more non-transitory computer-readable media of claim 17, wherein the magnitude of the first received signal is greater than the magnitude of the second received signal.

20. An eNodeB comprising:
the one or more non-transitory computer-readable media of claim 17; and
one or more processors coupled with the one or more computer-readable media and configured to execute the instructions.

* * * * *